Dec. 18, 1951     R. J. IFIELD     2,579,147
FLUID PRESSURE RESPONSIVE REGULATING MEANS
FOR USE IN LIQUID SUPPLY SYSTEMS

Filed April 14, 1948     2 SHEETS—SHEET 1

Inventor
R. J. Ifield

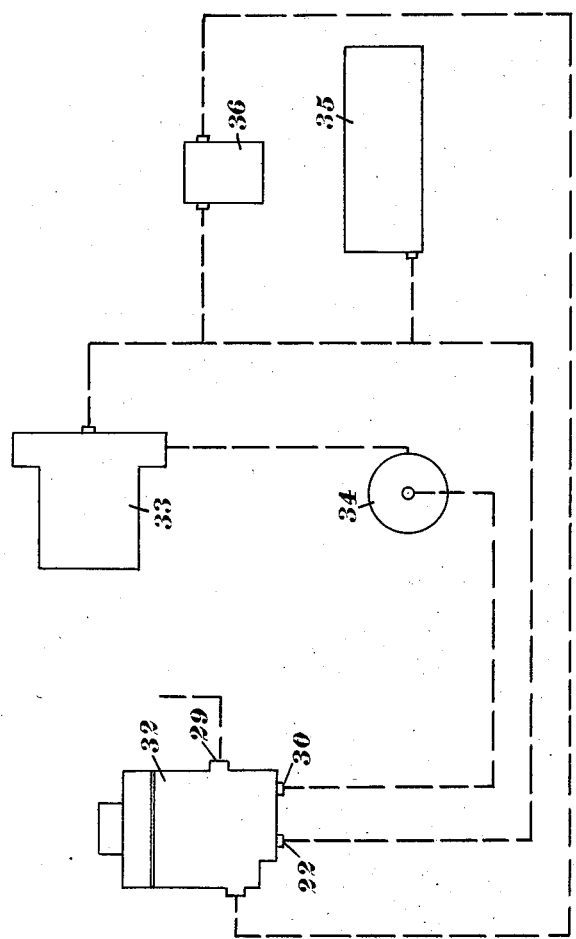

Patented Dec. 18, 1951

2,579,147

UNITED STATES PATENT OFFICE 2,579,147

FLUID PRESSURE RESPONSIVE REGULATING MEANS FOR USE IN LIQUID SUPPLY SYSTEMS

Richard Joseph Ifield, Exeter, New South Wales, Australia, assignor to Joseph Lucas Limited, Birmingham, England Application April 14, 1948, Serial No. 20,913
In Great Britain April 16, 1947

3 Claims. (Cl. 137—153)

Where liquid fuel is supplied to the combustion chamber of a jet-propulsion turbine, or like prime mover through a burner nozzle adapted to impart swirling motion to the liquid, it is a known practice to supply the liquid to the nozzle in excess of the amount required to be discharged, and to return the excess to the system for re-circulation, the excess being required to enable optimum swirling conditions to be maintained in the nozzle. Also it is a known practice to provide in the system means for automatically controlling the rate of flow of the returned excess, the said means being responsive to factors associated with the working conditions of the prime mover.

The object of the present invention is to provide an improved return-flow regulator adapted to be responsive to the pressure of the air supplied to the combustion chamber by a blower which latter is driven by the prime mover.

The invention comprises the combination of a duct adapted to be connected to the return-flow part of the system, a valve for controlling the inlet to the duct, and another valve for controlling a by-pass from the duct, the inlet valve having combined with it actuating means responsive to the difference between the blower-air pressure and the returned-fuel pressure, and the by-pass valve being responsive to the blower-air pressure.

In the accompanying drawings:

Figure 3 is a diagram showing the manner in which the regulator is connected in a return-flow system for supplying fuel to the burner nozzle of a combustion chamber.

Figure 1:
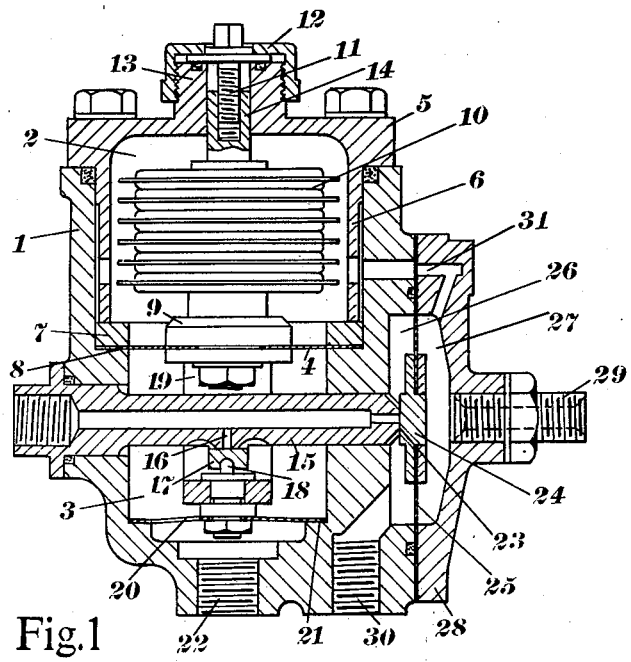
Figure 1 is a side elevation, in section, of a return-flow regulator for the purpose described, constructed in accordance with the invention.
Figure 2:
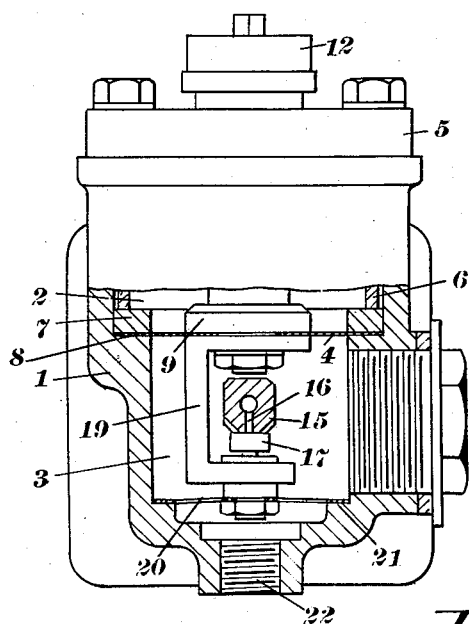
Figure 2 is an end elevation, partly in section, of the regulator shown in Figure 1.

In carrying the invention into effect according to one convenient mode as illustrated in Figures 1 and 2, a hollow body part 1 is provided which is divided into two compartments 2 and 3 by a flexible diaphragm 4. A cover 5 for the compartment 2 has a sleeve portion 6 extending within the compartment and engaging a ring 7 which holds the diaphragm upon a shoulder 8. A member 9 secured to the central portion of the diaphragm is connected to an elastic capsule 10 the interior of which is evacuated, the capsule being adjustably supported by a bolt 11 rotatable in a cover 12 screwed to a centrally bored boss 13 on the main cover 5. The bore in the boss 13 receives a slidable spindle 14 attached to the capsule 10 and threaded to receive the bolt 11.

Across the compartment 3 is arranged a duct 15 secured within the body part and in one side of the portion of the duct within the compartment is formed a by-pass outlet 16 which is controlled by a valve member 17 supported on a pin 18 which is carried by the lower limb of a U-shaped member 19 attached to the diaphragm 4. A perforated spring disc 20 attached to the lower end of the member 19 rests on a shoulder 21 at the lower end of the compartment 3 and serves to guide the valve member 17. The compartment 3 is provided with a connection 22 by which it is adapted to be placed in communication with the fuel supply tank or other low pressure part of the system.

The inlet end of the duct 15 is provided with a seating 23 with which co-operates a valve member 24 carried by a diaphragm 25. This diaphragm divides into two compartments 26 and 27 another hollow part of the body 1 which is closed by a cover 28 having therein a connection 29. A connection 30 communicates with the compartment 26. A passage 31 leads from the compartment 27 to the compartment 2 containing the evacuated capsule 10.

Referring to Figure 3, the regulator previously described is shown at 32 and the fuel pump at 33. The outlet of the fuel pump is connected to the nozzle 34, the return flow from which is led to the connection 30 of the regulator. The outlet 22 from the chamber 3 of the regulator is connected to the inlet of the pump 33 as also is the fuel supply tank 35. The end of the duct 15 opposite to the valve 24 is connected through an adjustable choke 36, which may be of any convenient construction, to the inlet of the fuel pump 33. The connection 29 communicating with the compartment 27 of the regulator 32 is connected to the part of the system which conveys the blower air.

The mode of action of the regulator above described is as follows:

Normally the by-pass valve 17 is closed, and the inlet valve 24 is open. During ordinary working conditions in the combustion chamber the inlet valve 24 is held open by the excess of the pressure of the liquid returned from the burner over the blower-air pressure. The returned liquid passes through the duct 15 and thence through other regulating means, such as the manually adjustable choke 36, to the fuel tank or any convenient part of the system leading to the inlet side of the supply pump.

The purpose of the by-pass valve 17 is to open the duct 15 to a discharge path of low resistance, and in particular the path leading from the connection 22 directly to the inlet side of the pump 33, when the speed of the prime mover exceeds a predetermined rate. In the event of this speed being exceeded the correspondingly increased pressure of the blower-air causes the by-pass valve to open. Normally this valve is held closed by the preponderance of fluid pressure acting on the underside of the diaphragm 4. From inspection of Figure 1 it will be seen that blower-air pressure in the chamber 2 and acting on the opposite ends of the capsule 10 tends to contract the capsule. This tendency is opposed by the pressure of the blower-air on the diaphragm 4 which is of sufficiently larger diameter to give the desired result. The upper side of the diaphragm is therefore subject to a force corresponding to the difference of the areas of the diaphragm and capsule, and tending to open the valve. But at all normal working speeds this force is less than that exerted on the underside of the diaphragm, and the valve remains closed. When the blower-air pressure exceeds a certain amount corresponding to the excess speed of the prime mover, the effective pressure acting on the upper side of the diaphragm exceeds the pressure acting on the underside, and causes the by-pass valve to open.

In the event of the pilot reducing the supply of fuel to the burner nozzle, causing a corresponding drop of fuel pressure acting on the diaphragm 25, the then preponderating blower-air pressure acting on the other side closes the valve 24, and so interrupts the return flow from the nozzle, and thereby prevents risk of extinction of the flame in the combustion chamber due to inadequacy of fuel supply.

By this invention the required control of the return flow by the blower-air pressure can be effected in a simple and reliable manner.

Having thus described my invention what I claim as new and desire to secure by Letters Patent is:

1. Flow-controlling means for liquid fuel under pressure, comprising in combination a duct having a by-pass intermediate its ends, a first valve for controlling the admission of liquid fuel under pressure to one end of the duct, a second valve controlling the by-pass, means responsive to the difference between the fuel pressure and a variable air pressure for actuating the first valve, and means responsive to the last mentioned pressure for actuating the second valve when that pressure exceeds a predetermined amount.

2. Flow-controlling means for liquid fuel under pressure, comprising in combination a hollow body, a flexible diaphragm dividing the hollow body into primary and secondary pressure compartments, an inlet through which air under variable pressure can be admitted to the primary pressure compartment, the secondary pressure compartment having an opening for maintaining a relatively low pressure in the interior of the secondary pressure compartment, a duct extending across the secondary pressure compartment and having a by-pass within the secondary pressure compartment, an inlet for liquid fuel under pressure, a first valve controlling communication between the fuel inlet and one end of the duct, a second valve controlling the by-pass, means for actuating the first valve in response to the difference between the pressures of the air and liquid fuel supplied to the inlets, an evacuated capsule of smaller effective area than the diaphragm arranged in the primary pressure compartment and connected to the diaphragm, and means connecting the second valve to the diaphragm so that the second valve is opened when the air pressure in the primary compartment exceeds a predetermined amount.

3. Flow-controlling means as claimed in claim 2 and comprising the combination with the hollow body, of a chamber divided into two compartments by a second diaphragm which carries and forms the means for actuating the first valve, one of the two chamber compartments being in communication with the fuel inlet, and the other being in communication with the air inlet and the primary pressure compartment.

RICHARD JOSEPH IFIELD.

No references cited.